United States Patent [19]

Tegtmeier et al.

[11] Patent Number: 5,572,937

[45] Date of Patent: Nov. 12, 1996

[54] RECIPROCATING GRATE COOLER

[75] Inventors: Gert Tegtmeier, Oelde; Manfred Strohbusch; Bernd Henrich, both of Ennigerloh; Pedro G. Palma, Lippetal; Andreas Halbleib, Beckum, all of Germany

[73] Assignee: Krupp Polysius AG, Germany

[21] Appl. No.: 589,427

[22] Filed: Jan. 22, 1996

Related U.S. Application Data

[63] Continuation of Ser. No. 368,038, Jan. 3, 1995.

[30] Foreign Application Priority Data

Jan. 24, 1994 [DE] Germany .......................... 44 01 931.9
Jun. 20, 1994 [DE] Germany .......................... 44 21 552.5

[51] Int. Cl.⁶ ..................................................... F23H 3/00
[52] U.S. Cl. .............................. 110/300; 110/298; 432/77
[58] Field of Search ................................. 110/258, 298, 110/299, 300; 432/77, 78

[56] References Cited

U.S. PATENT DOCUMENTS 2,245,211  6/1941  McMahan .............................. 110/299
4,762,489  8/1988  Schmits et al. ........................... 432/78
4,884,516  12/1989  Linsen ..................................... 110/298
5,330,350  7/1994  Tegtmeier ................................. 432/78

FOREIGN PATENT DOCUMENTS 213617  11/1924  United Kingdom ................... 110/299

*Primary Examiner*—Thomas E. Denion
*Attorney, Agent, or Firm*—Learman & McCulloch

[57] ABSTRACT

A reciprocating grate cooler has a plurality of grate plates mounted on a reciprocable support structure for conveying hot material longitudinally across a grate surface formed by the grate plates. The support structure has passages therein and an inlet for admitting cooling gases into the passages for delivery to the hot material. A stationary cooling gas delivery duct has an outlet adjacent the inlet of the support structure and both are provided with sealing frame plates mounted on the support structure and delivery duct, respectively, in generally parallel, closely spaced relation to one another to provide a wear-free dynamic air seal between the delivery duct and the support structure.

18 Claims, 5 Drawing Sheets

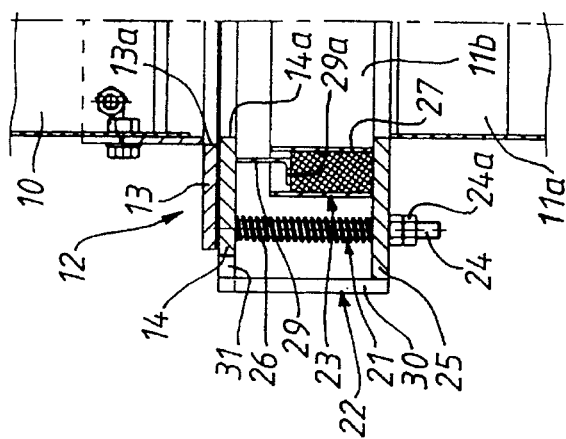
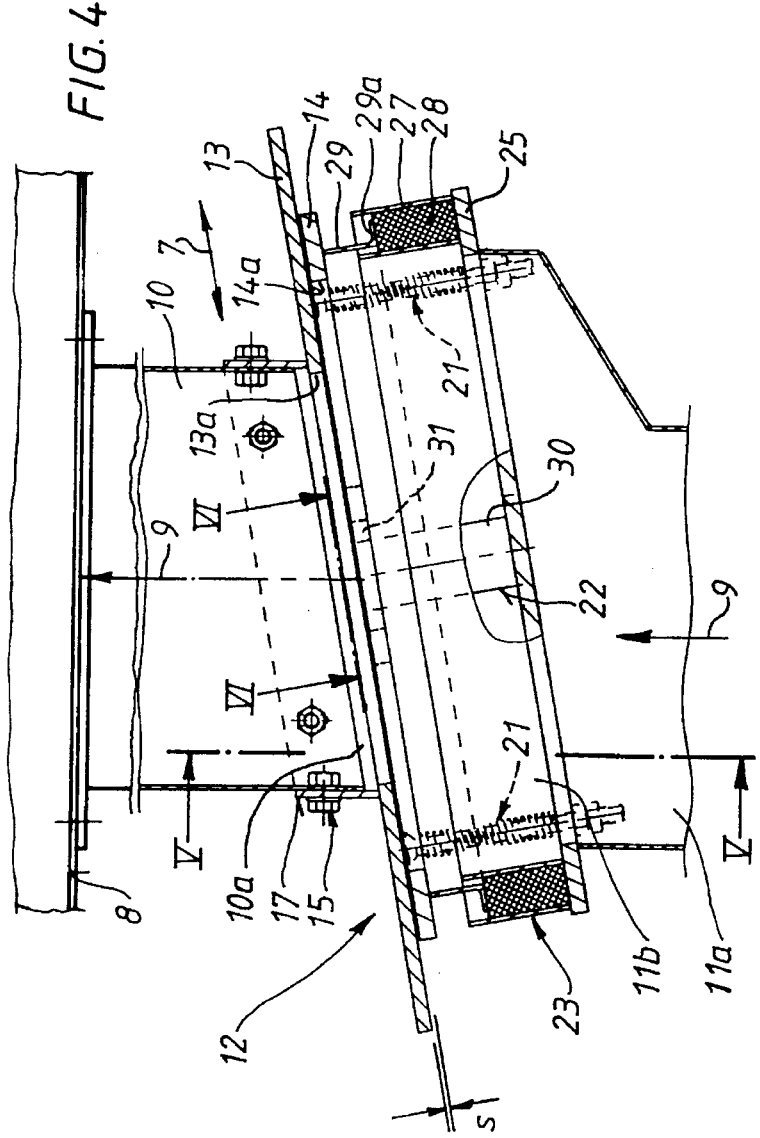
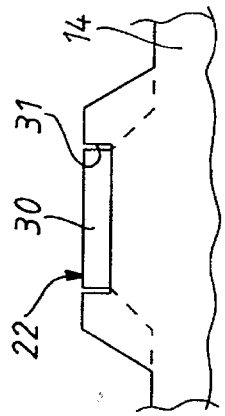

5,572,937

RECIPROCATING GRATE COOLER

This is a continuation of copending application Ser. No. 08/368,038 filed on Jan. 3, 1995.

The invention relates to a reciprocating grate cooler for hot material for cooling according to the preamble to claim 1.

Reciprocating grate coolers of the aforesaid type are well known in the art. In general, by the use of sensibly co-ordinated fixed and movable grate plates a grate surface is formed on which hot material for cooling which is thrown thereon is distributed and further conveyed, and it is cooled with the aid of a cooling gas streaming upwards from below through the grate plates. The material which is to be cooled can for example be hot cement clinker discharged a kiln, burnt lime, hot ore material or the like.

In these reciprocating grate coolers which are assumed to be known cooling gas or cooling air is delivered directly from below to the grate plates. For this reason the movable grate plates are firmly supported by way of hollow grate plate supports on a movable frame which is driven in a suitable manner and is movable to and fro in the longitudinal direction of the cooler, the grate plate supports simultaneously forming cooling gas delivery lines to the movable grate plates. It is necessary here for cooling gas delivered by way of stationary cooling gas delivery channels, into the lower part of the cooler housing to be passed on into the cooling gas delivery lines which are moved to fro. For this purpose the stationary cooling gas delivery channels are in ducting communication by way of compensating arrangements with corresponding cooling gas connection pieces which are moved therewith. In the reciprocating grate coolers which are known in the art the compensating arrangements between the stationary cooling gas delivery channels and the cooling gas connection pieces, which are moved to and fro, of the cooling gas delivery lines can be constructed for example in the form of tubular double joint connections or in the form of flexible steel wound hoses.

In the case of the material for cooling mentioned above it should be noted that this is relatively abrasive and therefore very severe wear occurs on joint parts or flexible parts which are exposed directly to this material for cooling, leading to regular breakdowns of the said components and thus resulting in shutdowns of the entire production line to which this reciprocating grate cooler belongs.

The object of the invention, therefore, is to construct a reciprocating grate cooler in the region of the compensating arrangements so as to ensure, with relatively simple construction and reliable guiding of the cooling gas, both a satisfactory seal between the stationary and moved components and also a largely wear-free co-operation of the components which are movable relative to one another.

SUMMARY OF THE INVENTION

Essential components of each compensating arrangement in the cooler construction according to the invention are two sealing frame plates which lie opposite one another with a small gap and extend parallel to one another and parallel to the direction of movement of the movable frame. Of these two co-operating frame plates in each case one first sealing frame plate is fixed on the appertaining cooling gas connection piece as well as immediately before the gas inlet opening thereof, whilst the second sealing frame plate is fixed on the end of the appertaining stationary cooling gas delivery channel inside the housing as well as immediately before the gas outlet opening thereof. Thus in each compensating arrangement constructed according to the invention the two sealing frame plates lie opposite one another with the smallest possible gap and completely without touching, so that the first sealing frame plate which is fixed on the cooling gas connection piece, which connection piece is movable to and fro jointly with the movable frame, can move freely relative to the second sealing frame plate mounted on the cooling gas delivery channel, although a relatively far-reaching seal is ensured between these two sealing frame plates. It should be noted in this case that due to the gap between these two sealing frame plates a relatively small proportion of the cooling gas to be passed on can indeed come out of this ducting connection or compensating arrangement. However, this brings with it the advantage that the emerging cooling gas keeps the narrow gap between the two sealing frame plates free from any possible dust or dust deposits of the material for cooling, so that the sealing frame plates can operate practically completely without wear because in normal operation there is no contact between the sealing surfaces which lie opposite one another a small distance apart. The relatively small proportion of cooling gas escaping through the gap enters the space below the grate surface and moreover supplements a confining air stream which is generally blown into this space in any case and which for its part passes through the gap between the movable and stationary grate plates and is distributed over the grate surface and escapes upwards through the layer of material for cooling.

A particularly reliable and disruption-free guiding of the cooling gas in the region of each compensating arrangement can be achieved in that the frame opening of the first sealing frame plate is adapted to the orifice cross-section of the gas inlet opening of the appertaining cooling gas connection piece and the frame opening of the second sealing frame plate is adapted to the gas outlet opening of the appertaining cooling gas delivery channel, so that these two cross-sections which lie opposite one another and are aligned with one another are of substantially the same width, but one cross-section has a length which is greater at least by the dimension of the to and fro movement (stroke movement) of the movable frame.

The reliability and the action of the two sealing frame plates, which lie opposite one another without touching, of each compensating arrangement can also be improved or if required can be reset in each case in that according to a sensible construction of the invention, of the two sealing frame plates which lie opposite one another, at least one can be adjusted relative to the other by setting a defined clear gap between them.

According to the present invention it is generally preferred that the movable frame has hollow girders on which the transversely extending grate plate supports of the movable grate plates are fixed and with which these hollow grate plate supports are in ducting communication, so that the cooling gas connection piece(s) which is/are movable therewith is/are connected to these hollow girders. This results in a particularly simple and favourable construction of the ducting connection or overall ducting for guiding the cooling gas from at least one cooling gas delivery channel to the individual movable grate plates.

By contrast, however, it may in many cases be advantageous for the cooling gas connection pieces moved with the movable frame to be fixed directly onto the hollow grate plate supports, and indeed preferably onto the underside thereof. In this case the movable frame can be constructed in the form of a simple profiled frame.

3

THE DRAWINGS

The invention will be explained in greater detail below with the aid of the drawings, in which:

FIG. 4 shows a similar partial sectional view to FIG. 3, but of a second embodiment of the compensating arrangement;

FIG. 5 shows a partial cross-sectional view according to the section line V—V in FIG. 4;

FIG. 6 shows a partial plan view of an outer portion of the second sealing frame plate (approximately according to the line VI—VI in FIG. 4);

DETAILED DESCRIPTION

Figure 1:
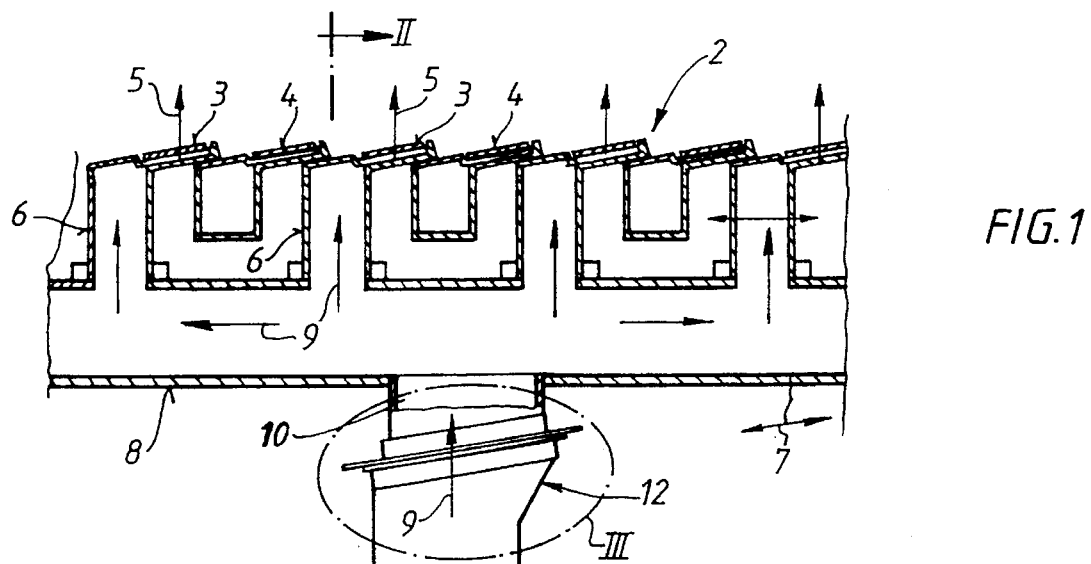
FIG. 1 shows a partial longitudinal sectional view (approximately according to the line I—I in FIG. 2), which has been kept quite schematic, of the reciprocating grate cooler according to the invention.
Figure 2:
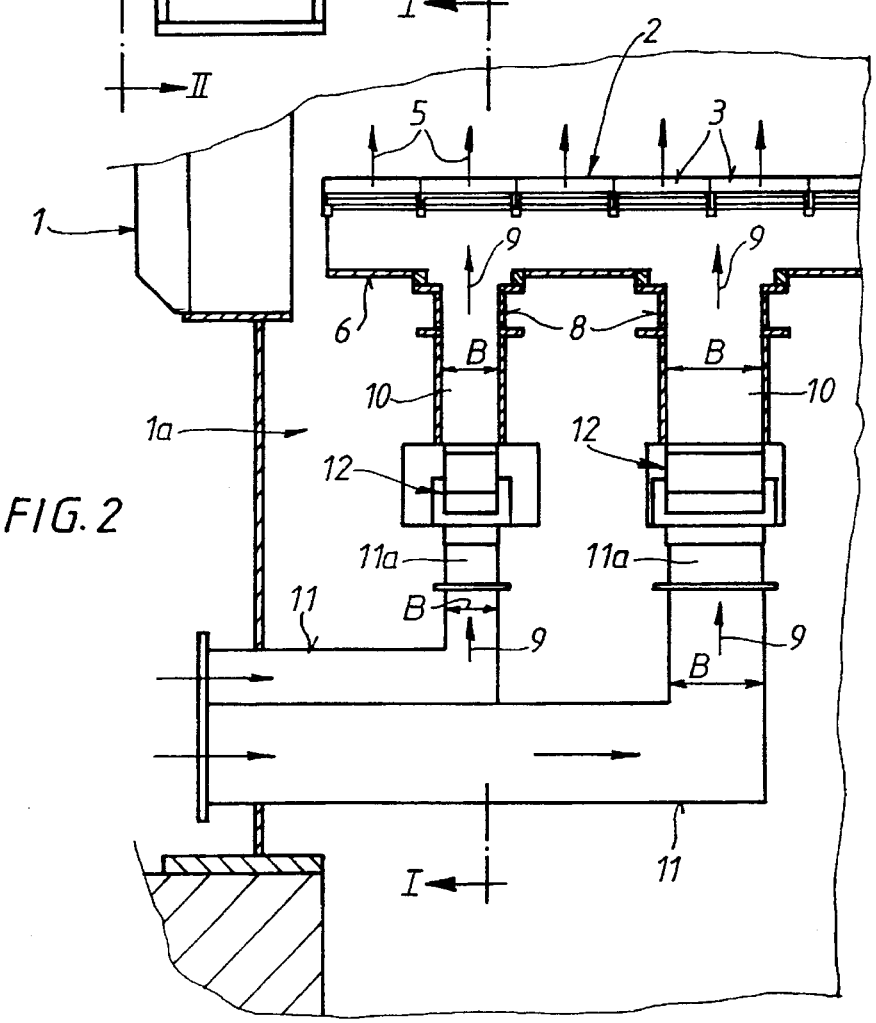
FIG. 2 shows a partial cross-sectional view approximately along the line II—II in FIG. 1.

Portions of the reciprocating grate cooler according to the invention are shown in FIGS. 1 and 2 only in the regions which are of principal interest in the present context. This reciprocating grate cooler comprises, in a manner which is known per se, a stationary and largely closed cooler housing 1 in which is disposed a grate surface 2 which receives and conveys the material for cooling and consists of a plurality of fixed and movable grate plates. In the present embodiment it may be assumed that the movable grate plates 3 and the fixed grate plates 4 alternate in the longitudinal direction of the grate surface 2, so that both the movable grate plates 3 and the fixed grate plates 4—as can be seen in FIG. 2—are in each case co-ordinated in transverse rows of movable or fixed grate plates respectively. Furthermore, all the grate plates 3, 4 are provided in the usual way, therefore not shown, with cooling gas openings so that a suitable cooling gas, particularly cooling air, can flow upwards from below through these grate plates, as indicated by arrows 5.

The movable grate plates 3 are mounted, in a manner which is also known per se, on approximately beam-like grate plate supports 6 so as to be fixed but replaceable. The grate plate supports 6 for their part are, in this embodiment, fixed on hollow girders 8, which are movable to and fro along a longitudinally extending path (double arrow 7) within the cooler. This supports 6 are driven in a suitable manner so as to be movable to and fro. In this case the grate plate supports 6 and the hollow girders 8 of the movable frame not only constitute a pure bearing and driving construction but they also simultaneously form in their interior cooling gas delivery lines for delivering cooling channels or gas (cooling air) indicated by arrows 9 to the movable grate plates 3. Furthermore, in this case cooling gas channels or connection pieces 10 are fixed on the underside of the hollow girders 8 and therefore moved therewith.

Stationary cooling gas delivery channels 11, which communicate with any suitable external cooling gas source, for example at least one cooling air fan, and are intended to deliver this cooling gas (arrows 9) to the said delivery lines, project into the lower part 1a of the cooler housing 1 located below the grate surface 2. In order to be able to equalise the reciprocating movements of the upper cooling gas delivery lines (grate plate supports 6 and hollow girders 8) relative to the appertaining stationary cooling gas delivery channels 11, the outlets of these cooling gas delivery channels 11 are placed in ducting communication with the inlets of the movable cooling gas channels or connection pieces 10 by compensating arrangements 12.

All compensating arrangements 12 can be constructed in the same way in principle (apart from a few possible adaptations to the internal cross-section of the appertaining cooling gas delivery channels 11).

A first embodiment of such a compensating arrangement 12 will be explained in greater detail with the aid of FIG. 3.

Figure 3:
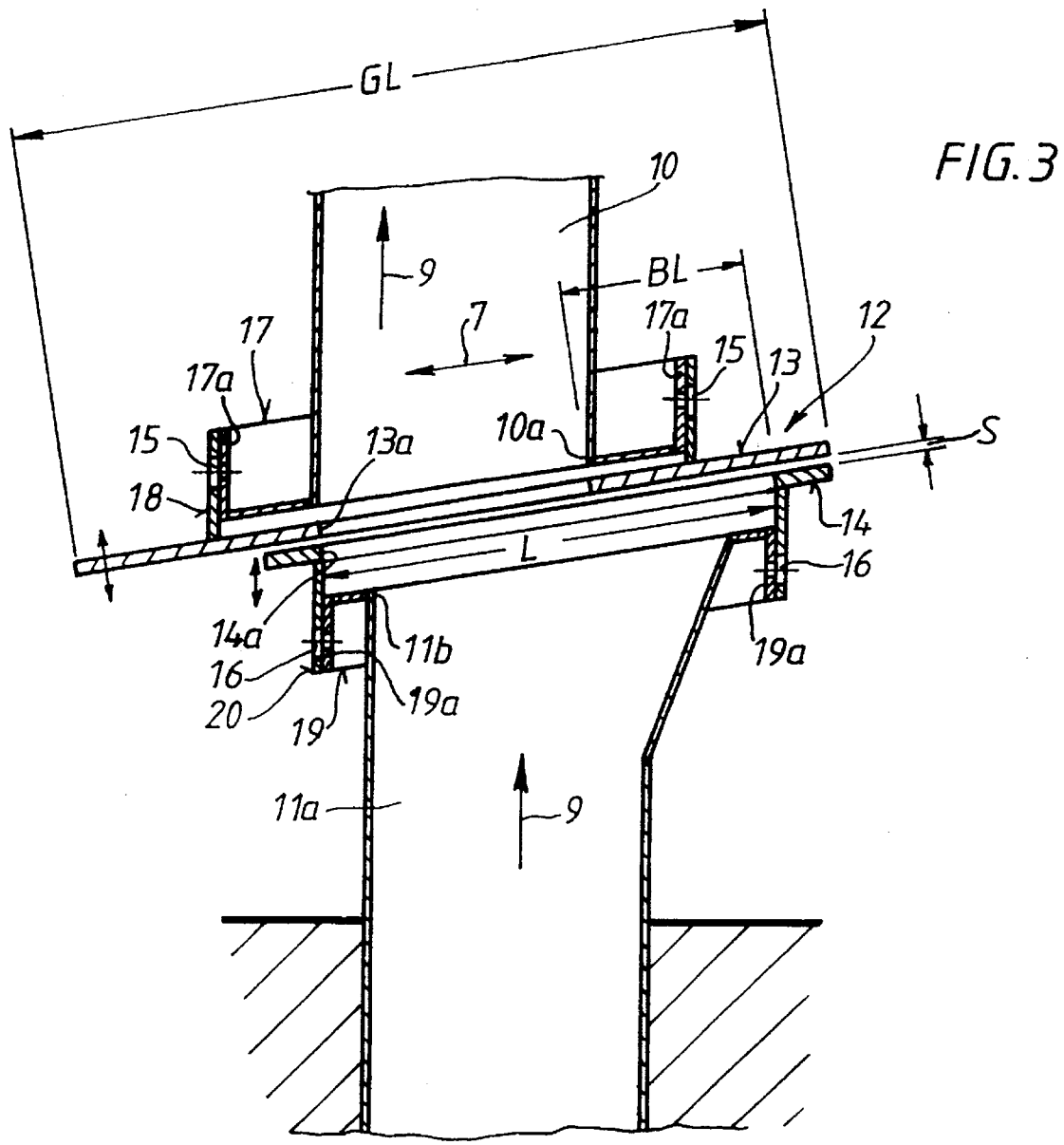
FIG. 3 shows an enlarged partial sectional view of a first embodiment of a compensating arrangement, approximately according to the detail III in FIG. 1.

In the embodiment according to FIG. 3 each compensating arrangement 12 comprises two sealing frame plates which lie opposite one another with a small gap s and extend parallel to one another and parallel to the direction of movement (arrow 7) of the hollow girders 8 (and thus also of the appertaining cooling gas connection pieces 10), namely the—in FIG. 3—upper first sealing frame plate 13 and the lower second sealing frame plate 14. Of these two sealing frame plates (pair of frame plates) which co-operate in the sense of a ducting seal, the upper first sealing frame plate 13 is fixed on the appertaining cooling gas connection piece 10 which is movable to and fro as well as immediately before the gas inlet opening 10a thereof and the lower second sealing frame plate 14 is fixed on the end 11a of the appertaining stationary cooling gas delivery channel 11 inside the housing as well as immediately before the gas outlet opening 11b thereof.

In this case the first sealing frame plate 13 has an opening or passage 13a corresponding to the area of and communicating with the gas inlet opening 10a of the cooling gas connection piece 10, and the second sealing frame plate 14 has an opening or passage 14a corresponding to the area of and communicating with the gas outlet opening 11b of the end of the cooling gas delivery channel 11 inside the housing. These two orifice cross-sections, which lie opposite one another and are aligned with each other, each have approximately the same width dimension B, but the length dimension L of the passage 14a is greater by at least the dimension BL of the stroke length of the hollow girders 8 of the movable frame. According to the embodiment illustrated here it is preferred that the orifice cross-section of the gas outlet opening 11b on the end of the stationary cooling gas delivery channel 11 inside %he housing and accordingly the clear frame opening 14a of the appertaining second sealing frame plate 14 is lengthened at least by the dimension BL of the movement to and fro of the hollow girders 8 of the movable frame. By contrast, the first sealing frame plate 13 which is movable with the hollow girder 8 has an overall length GL which is greater least by the dimension BL of the movement to and fro in such a way that the second sealing frame plate 14 always remains completely sealed by the first sealing frame plate 13 which co-operates with it during the entire movement to and fro (arrow 7) of the hollow girder 8.

As can also be seen in this connection in FIG. 3 (and also partially in FIG. 1), the clear orifice cross-section of the end 11a of the appertaining cooling gas delivery channel 11 inside the housing widens in the direction of the opposing cooling gas connection piece 10 and with respect to the clear orifice cross-section from the gas inlet opening 10a thereof in a funnel shape approximately as far as the increased length L. Thus in each phase of the movement to and fro a transfer cross-section of equal magnitude is ensured from the stationary end 11a of the delivery channel to the cooling gas connection piece 10 which is movable to and fro.

Furthermore, in each compensating arrangement 12 with a view to a defined adjustability of the clear gap s it is advantageous if of the two co-operating and opposing sealing frame plates 13, 14 of the compensating arrangement 12 at least one can be adjusted relative to the other; however, both sealing frame plates 13, 14 are preferably adjustable relative to one another. This adjustability may be created by any suitable arrangement. In the embodiment according to FIG. 3 it is proposed that the first sealing frame plate 13 is adjustably fixed on the appertaining cooling gas connection piece 10 by a plurality of first slot and screw connections—only indicated schematically at 15—and the second sealing frame plate 14 is adjustably fixed on the end 11a of the appertaining cooling gas delivery channel 11 inside the housing by second slot and screw connections—indicated schematically at 16.

As can be seen in FIGS. 1, 2 and 3, each compensating arrangement 12 connects an approximately vertically aligned cooling gas connection piece 10 to a substantially equally vertically aligned end 11a of the appertaining cooling gas delivery channel 11 inside the housing. Around the cooling gas connection piece 10 is fixed a first retaining collar 17 which runs all round and has vertically aligned walls 17a, and on the outer face thereof an approximately tubular first retaining part 18, extending parallel thereto, of the first sealing frame plate 13 its retained so that it is sealed and telescopically movable by way of the first slot and screw connections 15. In a Similar manner, around the end 11a of the corresponding cooling air delivery channel 11 inside the housing is fixed a second retaining collar 19 with vertically aligned walls 19a, and on the outer faces thereof a tubular second retaining part 20, extending parallel thereto, of the second sealing frame plate 14 is retained so that, it is sealed and telescopically movable by means of the second slot connections 16.

Thus by means of the measures last described above, in each compensating arrangement 12 both the first sealing frame plate 13 disposed on the movable cooling pipe connection piece 10 and the second sealing frame plate disposed on the stationary end 11a of the delivery channel can be adjusted and aligned extremely exactly and reliably relative to the sealing frame plate lying opposite it in each case in order in this way to produce a defined gap between these two frame plates 13 and 14, which gap s can be for example 1 to 2 mm.

A second embodiment of the construction of the compensating arrangements 12 will now be explained with the aid of FIGS. 4 to 6. In these drawings all those parts of the compensating arrangement 12 constructed in the same way as in the example of FIG. 3 are provided with the same references, so that it is not necessary to discuss the design and construction thereof in detail again since each compensating arrangement 12 of this second embodiment can be disposed in the same way or at the same location as is illustrated and described with the aid of FIGS. 1 and 2.

Thus in this second embodiment also (FIGS. 4 to 6) each compensating arrangement 12 is disposed between a cooling gas connection piece 10 which is movable to and fro together with the hollow girder 8 in the direction of the double arrow 7 and the end 11a of a stationary (fixed) cooling gas delivery channel inside the housing.

In the same way as in the first embodiment according to FIG. 3, this second embodiment of the compensating arrangement 12 also comprises two sealing frame plates which lie opposite one another with a small gap s and extend parallel to one another and parallel to the direction of movement (arrow 7) of the cooling gas connection piece 10, and of these the upper first sealing frame plate 13 is again fixed on the appertaining cooling gas connection piece 10 which is movable to and fro as well as immediately before the gas inlet opening 10a thereof and the lower second sealing frame plate 14 is fixed on the end 11a of the delivery channel inside the housing as well as immediately before the gas outlet opening 11b thereof. As regards the dimensions and the frame openings 13a and 14a as well as the other dimensions of these sealing frame plates 13 and 14, these are identical to the corresponding constructions of the first embodiment described in detail with the aid of FIG. 3.

Also in this second embodiment (FIGS. 4 to 6) it is provided that both sealing frame plates are adjustable relative to one another. For this purpose as in the first embodiment according to FIG. 3 the upper first sealing plate 13 can be telescopically movable for instance with the aid of a retaining collar 17 on the cooling gas connection piece 10 and is retained so that it can be fixed by means of slot and screw connections 15.

As a variant of the first embodiment the lower second sealing frame plate 14 according to FIGS. 4 to 6 is retained by a plurality of individually adjustable setscrew and compression spring arrangements 21, which are distributed over the periphery of the frame plate 14, so that it is movable on the stationary end 11a of the delivery channel inside the housing and retained resiliently relative to this end 11a of the delivery channel. Moreover, between this second sealing frame plate 14 and this end 11a of the delivery channel is co-ordinated on the one hand a position guiding arrangement 22 and on the other hand a flexible sealing arrangement 23.

As can be seen in FIGS. 4 and 5, each setscrew and compression spring arrangement 21 has a setscrew 24 with lock nuts 24a. These setscrews 24 engage with their upper end on the second sealing frame plate 14 and extend with their lower end through a flange 25 which is fixed on the outside of the end 11a of the delivery channel inside the housing. Between this flange 25 which is stationary—together with the end 11a of the delivery channel—and the second sealing frame plate 14 a compression spring 26 is gripped on the setscrew 24 of each setscrew and compression spring arrangement 21. Thus the lower second sealing frame plate 14 can be adjusted extremely precisely relative to the upper frame plate 13 by corresponding turning of the lock nuts 24a, but if required the lower frame plate 14 can be pushed downwards in a sprung manner (resiliently) downwards relative to the stationary end 11a of the delivery channel. This resilience of the lower second sealing frame plate can be advantageous if the movable grate part should be somewhat lowered for any operational reasons, so that the upper first sealing frame plate 13 can then come into contact with the lower frame plate 14, i.e. in the case of such lowering of the movable grate part the lower sealing frame plate 14 can be correspondingly deflected downwards, so that then because of the defined and adjustable spring tension only a small frictional force can occur between the two frame plates 13 and 14 which can then, however, be cancelled again by readjustment or resetting of the lower second frame plate 14. In the case of this sprung or downwardly resilient retention of the lower second sealing frame plate 14 on the end 11a of the delivery channel inside the housing, the flexible sealing arrangement 23 is provided in order also not to allow any cooling gas to escape between this frame plate 14 and the flange 25. According to FIGS. 4 and 5 this flexible sealing arrangement 23 can have a guide channel 27 surrounding the gas outlet opening 11b of the end 11a of the delivery channel with an elastic seal 28 laid therein as well as a sealing frame 29 fixed on the underside of the second sealing frame plate 14 and running around the frame opening 14a thereof. This sealing frame 29 can for example—as shown in FIGS. 4 and 5—be constructed in the form of an angle section frame, the lower angle arm 29a of which engages in the guide channel 27 which is open towards the top, the said angle arm being pressed in a sprung manner against the elastic Seal 28 located therein. This elastic seal can be a suitable temperature-resistant material, for example sealing cords or sealing strips which are known per se and made from glass fibre or ceramic fabric, or silicon mass. In the event of the lowering of the movable grate part for operational reasons as mentioned above this flexible sealing arrangement 23 permits a corresponding flexible lowering of the second sealing frame plate 14 without cooling gas brought from below being able to escape in these regions as a result.

FIGS. 4 to 6 also show a possible construction showing how in the case of lowering of the movable grate part for operational reasons and thus in the case of sprung resilience of the lower second sealing frame plate 14 the latter can be held in the transverse direction in its position relative to the upper first sealing frame plate 13, in fact by the position guiding arrangement 22 already described above. In the illustrated embodiment this position guiding arrangement 22 comprises two guide projections 30 which are fixed on the end 11a of the delivery channel on opposing sides (long sides) of the gas outlet opening 11b, are directed towards the upper first sealing frame plate 13 and can be formed for example by flat guide strips. Likewise, on the long sides of the second sealing frame plate 14 guide recesses 31 belonging to the position guiding arrangement 22 are provided which—as FIG. 6 shows—can be of approximately forked construction (as guide forks) and of which each one is in slidable guiding engagement with one of the two guide projections 30. These guide recesses (guide forks) 31 can be integrally moulded or separately attached on the two long sides of the lower sealing frame plate 14; advantageously the guide projections 30 and guide recesses 31—as FIG. 4 shows—lie directly opposite one another on approximately half the length of the long sides of the frame plate.

Figure 7:
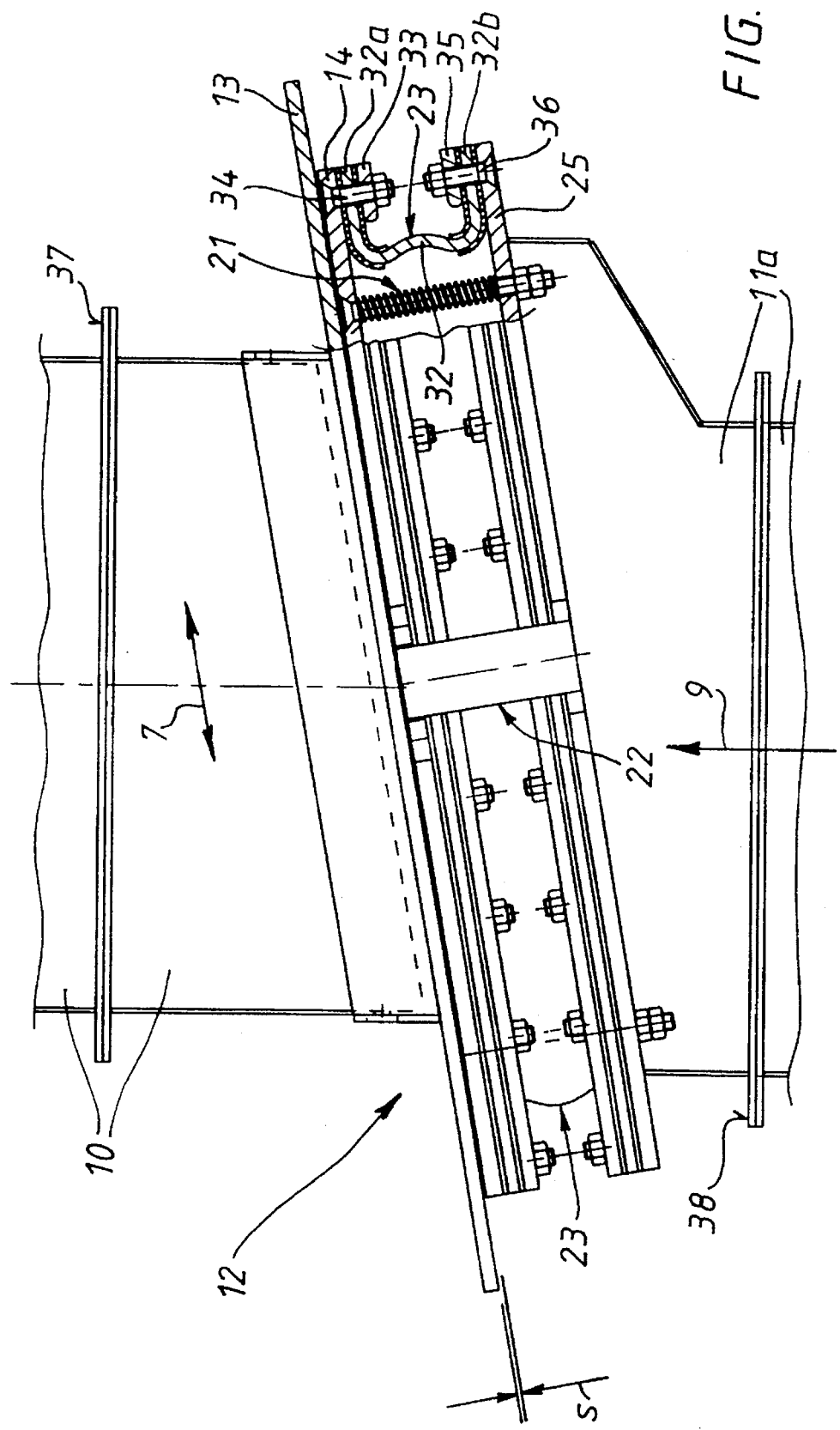
FIG. 7 shows a partially sectioned, enlarged partial side view (approximately according to detail III in FIG. 1) of a further embodiment of the compensating arrangement.

With the aid of FIG. 7 a further possible construction of the flexible sealing arrangement 23 will be explained, i.e. the embodiment according to FIG. 7 is to some extent a variant of the construction of the compensating arrangement 12 explained previously with the aid of FIGS. 4 to 6, so that all the same parts of the arrangement can be provided with the same reference numerals as in the preceding example (in so far as is necessary).

Also in this embodiment (FIG. 7) the compensating arrangement 12 is disposed in the region or transition between the stationary or fixed end 11a of the delivery channel and the cooling gas connection piece 10 which is movable to and fro in the direction of the double arrow 7. The two opposing sealing frame plates 13 and 14 can likewise be adjustably retained by setscrew and compression spring arrangements 21 and guided by two position guiding arrangements 22 lying opposite one another on the long sides, as has been explained in detail with the aid of FIGS. 4 to 6.

In contrast to the preceding example, in this variant according to FIG. 7 the flexible sealing arrangement 23 is essentially formed by a fabric hose 32 which surrounds the gas outlet opening 11b of the end 11a of the delivery channel and which to some extent constitutes a flexible fabric compensator and is produced from a temperature-resistant fabric material, such as for example silicon-coated glass fibre fabric. As is illustrated in the right-hand part of FIG. 7 in partial section, the upper end 32a of the fabric hose 32 can be releasably fixed between the outer peripheral rim of the second sealing frame plate 14 and a clamping flange 33 as well as by means of screws 34, whilst the lower end 32b of the hose can be gripped in a similar manner between the fixed flange 25 of the end 11a of the delivery channel and a further clamping flange 35 as well as by means of screws 36. In this way a gas-tight seal is also produced between the stationary end 11a of the delivery channel and the second sealing frame plate 14 which is retained resiliently with respect thereto.

As is also made clear by a comparison between the embodiments of FIGS. 3 to 6 on the one hand and the embodiment according to FIG. 7 on the other hand, in this reciprocating grate cooler according to the invention the possibilities exist for building the essential parts of the compensating arrangement 12, namely the sealing frame plates 13 and 14, directly onto the corresponding gas channels (10 and 11a) or for constructing the or each compensating arrangement 12 according to the representation in FIG. 7 as a separate structural unit and installing it in the transition from the upper end 11a of the appertaining stationary cooling gas delivery channel inside the housing to the cooling gas connection piece 10 which is movable to and fro, and preferably doing so by corresponding flange connections 37 or 38. Such separate structural units as compensating arrangements 12 can then also be installed at a later stage in existing reciprocating grate coolers in an extremely simple manner.

Figure 8:
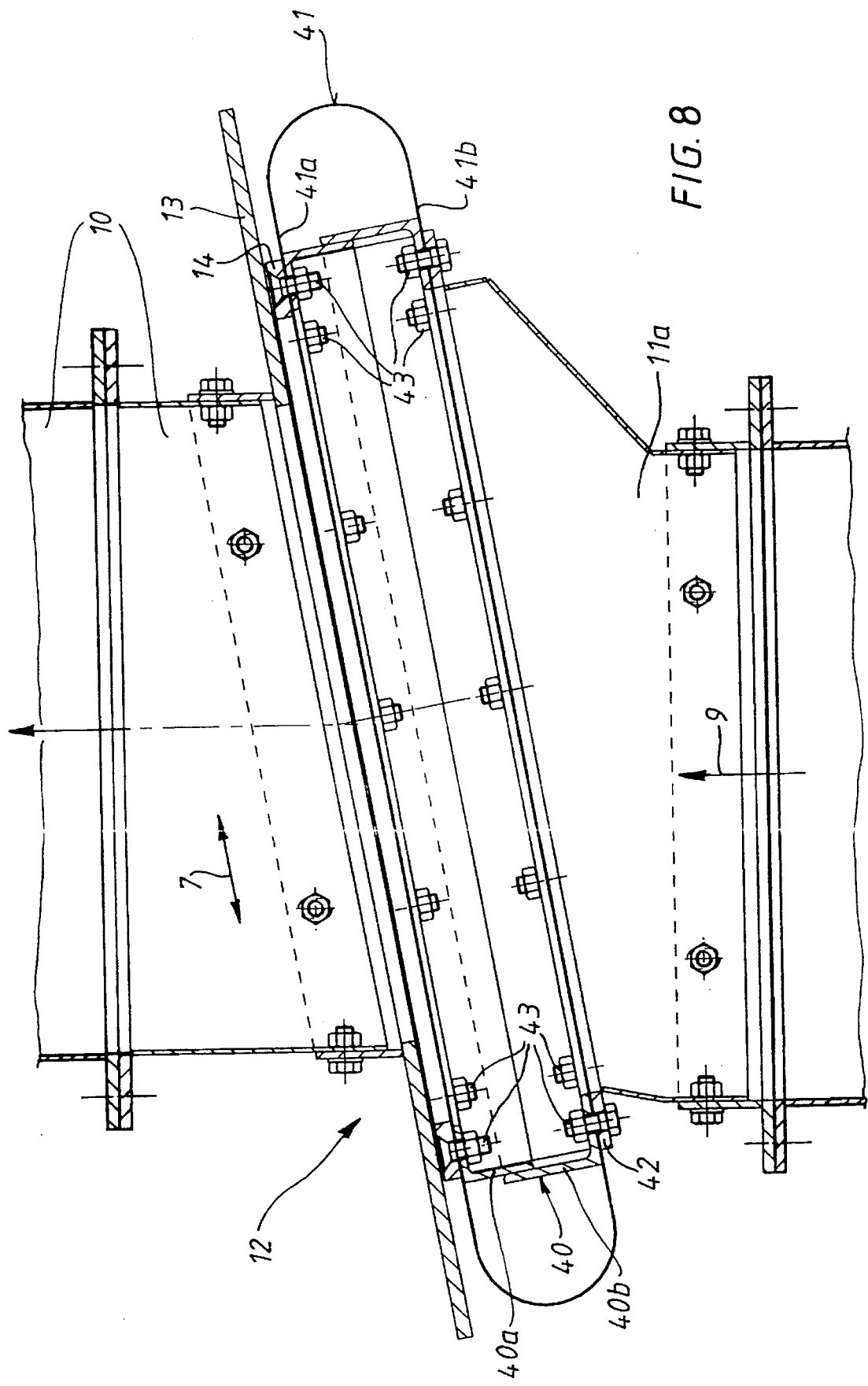
FIG. 8 shows a similar vertical sectional view to FIG. 3, for explanation of a further embodiment.

FIG. 8 illustrates a further embodiment showing how each compensating arrangement 12 provided according to the invention can be constructed without departing from the basic principle of the invention as described with the aid of FIGS. 1 to 3. Accordingly this compensating arrangement is again disposed in the region or transition between the stationary end 11a of the delivery channel and the cooling gas connection piece 10 which is movable to and fro in the direction of the double arrow 7 and which can be constructed in exactly the same Way and provided with a first sealing frame plate 13 as has been described in detail above, particularly with the aid of FIG. 3. Also the second sealing frame plate 14 which lies opposite the movable first sealing frame plate 13 and co-operates therewith is again basically disposed on the stationary end 11a of the delivery channel.

Moreover, in the case of this embodiment according to FIG. 8 it is also regarded as advantageous to retain the lower second sealing frame plate 14 in the end 11a of the delivery channel inside the housing so that it is sprung or resilient downwards. For this purpose this lower second sealing frame plate 14 is fixed on the upper end of a telescopic frame 40 which is surrounded or enclosed on its outer peripheral face by a thin compensating sealing plate 41 which is curved approximately in a U shape in cross-section. This sealing plate 41 can in general be a simple thin steel plate, and sometimes in cases in which particularly strong spring properties are desired it can also be produced from a thin spring steel plate. In each case, however, this compensating sealing plate 41 surrounds the telescopic frame 40 in a sealing manner, and—when this telescopic frame is considered in plan view—it is rounded with a suitable radius in the corner regions of the telescopic frame 40. Such compensating sealing plates are basically known in the relevant sector as so-called "steel shaft compensators".

As the representation in FIG. 8 also shows, the telescopic frame 40 has two individual frames, namely an upper individual frame 40a and a lower individual frame 40b, each of which is made up of angled steel sections, preferably of unequal-sided angled steel sections. In this case the individual frames 40a and 40b, which are in principle constructed in the same manner, only differ somewhat in their cross-sectional dimension in such a way that they interengage and fit into one another and thus can be pushed telescopically towards one another, so that with their interengaging frame portions—as can be seen in FIG. 8—they simultaneously form a straight guide as well as at least a partial seal of the telescopic frame 40 formed thereby. It can also be seen in FIG. 8 that of the unequal-sided angled steel sections of both individual frames 40a, 40b in each case the longer arms of the angled steel sections are directed towards one another and interengage so that they overlap sufficiently and thus can create a particularly favourable telescopic guide and seal.

In this construction of the compensating arrangement 12 illustrated in FIG. 8 the upper arm 41a of the U of the sealing plate 41 can be clamped between the upper face of the upper individual frame 40a and the second sealing frame plate 14 and the lower arm 41b of the U of the sealing plate 41 can be clamped between the lower end of the lower individual frame 40b and a supplementary flange 42 with the aid of screws 43.

Thus this embodiment according to FIG. 8 has a relatively simple construction and constitutes a particularly robust design for a sprung or downwardly resilient means for retaining the lower second sealing frame plate 14 on the end 14a of the delivery channel inside the housing.

In general it may be pointed out that each previously described embodiment of the compensating arrangements 12 is particularly preferably connected to an appertaining cooling gas connection piece 10 which is fixed on the underside of a hollow girder 8 of the movable frame, according to the detailed explanation with the aid of FIGS. 1 and 2. Moreover, however, if required it is also basically possible that the cooling gas connection pieces 10 moved with the movable frame can be fixed directly on the hollow grate plate supports 6, preferably on the underside thereof, so that an appertaining compensating arrangement 12 then again assures a ducting connection of this cooling gas connection piece 10, which is fixed on the grate plate supports 6 but again moved with the movable frame, and the appertaining cooling gas delivery channel 11.

Finally it may also be mentioned that it is possible without difficulty for specific components of the various embodiments described above, particularly the various embodiments of the compensating arrangement 12, to be combined sensibly with one another.

We claim:

1. Reciprocating grate cooler apparatus comprising a stationary housing; a plurality of fixed and movable grate plates; means mounting said fixed grate plates in said housing; means supporting the movable grate plates in said housing for reciprocating movements relative to said housing and to said fixed grate plates along a path having a selected stroke length; stationary cooling gas delivery means supported in said housing for receiving cooling gas from a source thereof; movable cooling gas delivery means carried by said supporting means for movements therewith and relative to said stationary gas delivery means along said path for receiving cooling gas from said stationary gas delivery means and discharging said cooling gas toward said grate plates; and compensating means communicating with said stationary and movable gas delivery means for delivering cooling gas from said stationary gas delivery means to said movable gas delivery means, said compensating means comprising first and second frame plates mounted on said stationary and movable gas delivery means respectively, each of said frame plates having a cooling gas passage therethrough in communication with the cooling gas passage of the other of said frame plates, said frame plates being spaced apart from one another by a gap of such width as to avoid contact between said frame plates and provide a dynamic seal between said stationary and movable gas delivery means during said relative movement thereof.

2. The apparatus according to claim 1 wherein said stationary gas delivery means has an outlet of selected area, said movable gas delivery means has an inlet of selected area, and the passage in that frame plate mounted on said stationary gas delivery means has an area corresponding substantially to that of said outlet and the passage in that frame plate mounted on said movable gas delivery means has an area corresponding substantially to that of said outlet.

3. The apparatus according to claim 2 wherein the area of the passage in the frame plate mounted on said stationary gas delivery means is greater than the area of the passage in the frame plate mounted on the movable gas delivery means.

4. The apparatus according to claim 3 wherein the area of the passage in the frame plate mounted on the stationary gas delivery means is sufficiently larger that the area of the passage in the frame plate mounted on the movable gas delivery means that the inlet of said movable gas delivery means is not obstructed by the frame plate mounted on the stationary gas delivery means.

5. The apparatus according to claim 3 wherein the passage in the frame plate mounted on the stationary gas delivery means has a dimension greater than the corresponding dimension of the passage int the other of said frame plates and parallel to said path which is at least equal in length to said stroke length.

6. The apparatus according to claim 1 wherein the outlet of said stationary gas delivery means widens in a direction toward the frame plate mounted thereon.

7. The apparatus according to claim 1 including adjusting means for effecting relative movement of said frame plates toward and away from one another to vary the width of said gap.

8. The apparatus according to claim 7 wherein said adjusting means comprises a collar in telescoping assembly with at least one of said frame plates and releasable locking means for releasably locking said collar and said one of said frame plates in a selected one of a number of adjusted portions relative to the other of said frame plates.

9. The apparatus according to claim 8 wherein said releasable locking means comprises screw and slot connections.

10. The apparatus according to claim 1 wherein at least one of said frame plates is mounted on its associated gas delivery means by adjustable coupling means operable to adjust the width of said gap.

11. The apparatus according to claim 10 wherein said adjustable coupling means comprises a plurality of fasteners interconnecting the frame plate mounted on said stationary gas delivery for moving the frame plate mounted on said stationary gas delivery means toward said outlet and a plurality of springs acting on the frame plate mounted on said stationary gas delivery means for biasing such frame plate in a direction away from said outlet.

12. The apparatus according to claim 11 including a flexible seal between said stationary gas delivery means and the frame plate mounted thereon.

13. The apparatus according to claim 12 wherein said flexible seal comprises a split hose encircling said outlet and having one of its edges secured to said stationary gas delivery means and its other edge secured to the frame plate mounted on said stationary gas delivery means.

14. Reciprocating grate cooler apparatus comprising a plurality of fixed and movable grate plates; means mounting said fixed grate plates in a fixed position; means supporting the movable grate plates for reciprocating movements relative to said fixed grate plates along a path having a selected stroke length; stationary cooling gas delivery means supported in a position to receive cooling gas from a source thereof and having an outlet; movable cooling gas delivery means carried by said supporting means for movements therewith and relative to said stationary gas delivery means along said path and having an inlet for receiving cooling gas from the outlet of said stationary gas delivery means and discharging said cooling gas toward said grate plates; a first frame mounted on said stationary gas delivery means and having a gas passage therethrough; a second frame mounted on said movable gas delivery means and having a passage therethrough in communication with said inlet and with the passage in said first frame; said frames being spaced apart by a gap of such width as to avoid contact between said frames and provide a dynamic seal between Said stationary and movable gas delivery means during said relative movement thereof.

15. The apparatus according to claim 14 wherein the area of said outlet is greater than that of said inlet.

16. The apparatus according to claim 15 wherein the passage in said first frame has an area corresponding substantially to that of said outlet and the passage in said second frame has an area corresponding substantially to that of said inlet.

17. The apparatus according to claim 14 wherein the passage in said first frame has a dimension parallel to said path which is longer that the corresponding dimension of the passage in said second frame by a distance corresponding substantially to that of said stroke length.

18. The apparatus according to claim 14 including means for adjusting said frames toward and away from one another to adjust the width of said gap.

* * * * *

UNITED STATES PATENT AND TRADEMARK OFFICE
CERTIFICATE OF CORRECTION

PATENT NO. : 5,572,937
DATED : November 12, 1996
INVENTOR(S) : Gert Tegtmeier et al It is certified that error appears in the above-indentified patent and that said Letters Patent is hereby corrected as shown below:

Column 1, bridging lines 5 and 6, cancel "according to the preamble to claim 1".

Column 1, between lines 6 and 7, insert the centered heading -- BACKGROUND OF THE INVENTION --.

Column 1, line 13, after "discharged" insert -- from --.

Column 3, line 60, cancel "channels or".

Column 4, line 48, after "end" insert -- 11a --.

Column 4, line 49, "%he" should be -- the --.

Column 4, line 55, after "greater" insert -- at --.

Column 5, line 30, "its" should be -- is --.

Signed and Sealed this

Twentieth Day of May, 1997

Attest:

BRUCE LEHMAN

Attesting Officer

Commissioner of Patents and Trademarks